US006873183B1

(12) United States Patent
Kaviani et al.

(10) Patent No.: US 6,873,183 B1
(45) Date of Patent: Mar. 29, 2005

(54) METHOD AND CIRCUIT FOR GLITCHLESS CLOCK CONTROL

(75) Inventors: Alireza S. Kaviani, San Jose, CA (US); Austin H. Lesea, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 147 days.

(21) Appl. No.: 10/436,781

(22) Filed: May 12, 2003

(51) Int. Cl.$^7$ ............................................. H03K 19/173
(52) U.S. Cl. ............................... 326/46; 326/38; 326/93
(58) Field of Search ............................... 326/37–41, 46, 326/47, 93–98

(56) References Cited

U.S. PATENT DOCUMENTS

| | | | |
|---|---|---|---|
| 4,635,249 A | | 1/1987 | Bortolini et al. |
| 5,623,223 A | | 4/1997 | Pasqualini |
| 5,694,327 A | * | 12/1997 | Schurig et al. ................. 716/1 |
| 6,041,371 A | * | 3/2000 | Provence ..................... 710/58 |
| 6,266,780 B1 | | 7/2001 | Grundvig et al. |
| 6,275,546 B1 | | 8/2001 | Miller et al. |
| 6,348,828 B1 | | 2/2002 | Barnes |
| 6,429,698 B1 | | 8/2002 | Young |
| 6,453,425 B1 | * | 9/2002 | Hede et al. ................. 713/501 |
| 6,472,909 B1 | | 10/2002 | Young |
| 6,532,257 B1 | * | 3/2003 | Piirainen ..................... 375/226 |
| 6,782,064 B1 | * | 8/2004 | Schwake ..................... 375/354 |

OTHER PUBLICATIONS

Randy Nuss, "A New Paradigm for Synchronous State Machine Design in Verilog," 1999, pp. 1–7, available at www.ideaconsulting.com, Idea Consulting.

* cited by examiner

*Primary Examiner*—Don Le
(74) *Attorney, Agent, or Firm*—Arthur J. Behiel; Edel M. Young; Justin Liu

(57) ABSTRACT

A clock control circuit routes one of a plurality of clock signals to a clock output node, and employs an asynchronous state machine to switch between clock signals without introducing glitches. To switch from a first to a second clock, the control circuit samples the logic level of the first clock signal to obtain a sampled logic level. The control circuit then provides a constant version of the sampled logic level on the clock output terminal until the second clock signal transitions to the sampled logic level, at which point the control circuit routes the second clock signal to the clock output node.

19 Claims, 4 Drawing Sheets

METHOD AND CIRCUIT FOR GLITCHLESS CLOCK CONTROL

BACKGROUND

Synchronous circuits often employ some form of clock switching circuitry to select from among two or more clock signals. For example, some complex systems include multiple subsystems timed to different clock signals. Programmable logic devices that support such locally synchronous, globally asynchronous systems include clock control circuitry capable of routing different clock signals to different subsystems. Similar control circuitry may also support circuits capable of operating in response to two or more separate clock signals. For example, integrated circuits that operate in accordance with the proposed PCI-X bus interface standard operate in response to either a 133 MHz clock signal or a 66 MHz clock signal.

FIG. 1 (prior art) depicts a two-to-one clock control circuit 100 that provides either of two clock signals CLK1 and CLK2 on a clock-distribution node CLK3, and advantageously switches between those two clock signals without generating a glitch on node CLK3. (As with other designations herein, CLK1, CLK2, and CLK3 each refer both to a signal and its corresponding node; whether a given designation refers to a signal or a node will be clear from the context.)

Clock control circuit 100 includes NAND gates 101–103, D-type flip-flops 111 and 112, 2-to-1 multiplexers 121 and 122, a configuration memory cell 123, inverters 131–134, and n-channel pass transistors 141 and 142. Inverter 134 and NAND gate 103 are connected to form keeper circuit 150.

Clock signal CLK1 is applied to inverting and non-inverting input terminals of multiplexer 121. Multiplexer 121 is controlled by a configuration value stored in configuration memory cell 123. Thus, if configuration memory cell 123 stores a logic "0" value, then multiplexer 121 routes the inverse of clock signal CLK1 (i.e., CLK1$b$). Conversely, if configuration memory cell 123 stores a logic "1", value, then multiplexer 121 routes the clock signal CLK1. The output terminal of multiplexer 121 is coupled to the clock input terminal of flip-flop 111. In the described embodiment, flip-flop 111 is a rising edge triggered flip-flop. As described below, multiplexer 121 effectively enables flip-flop 111 to be triggered by either the rising edges or the falling edges of the CLK1 signal.

A secondary clock signal CLK2 is applied to inverting and non-inverting input terminals of multiplexer 122. Multiplexer 122 is also controlled by a configuration value stored in configuration memory cell 123. Thus, if configuration memory cell 123 stores a logic "0" value, then multiplexer 122 routes the inverse of clock signal CLK2 (i.e., CLK2$b$). Conversely, if configuration memory cell 123 stores a logic "1" value, then multiplexer 122 routes the clock signal CLK2. The output terminal of multiplexer 122 is coupled to the clock input terminal of flip-flop 112. In the described embodiment, flip-flop 112 is a rising edge triggered flip-flop. As described in more detail below, multiplexer 122 effectively enables flip-flop 112 to be triggered by either the rising edges or the falling edges of the CLK2 signal.

A clock select signal SEL is provided to an input terminal of NAND gate 101. The Q output terminal of flip-flop 112, which carries output signal $Q_{112}$, is coupled to the other input terminal of NAND gate 101. The clock select signal SEL is also provided to inverter 133. In response, inverter 133 provides the inverse of the clock select signal SEL to an input terminal of NAND gate 102. The Q output terminal of flip-flop 111, which carries output signal $Q_{111}$, is coupled to the other input terminal of NAND gate 102.

NAND gate 101 provides input signal $D_{111}$, to the D input terminal of flip-flop 111. NAND gate 102 provides input signal $D_{112}$ to the D input terminal of flip-flop 112. Flip-flop 111 has a reset input terminal (R) coupled to receive a power-on-reset signal POR. Flip-flop 112 has a set input terminal (S) coupled to receive the power-on-reset signal POR.

The output terminals of flip-flops 111 and 112 are further connected to input terminals of inverters 131 and 132, respectively. The output terminals of inverters 131 and 132 are coupled to gate electrodes of pass transistors 141 and 142, respectively. The CLK1 and CLK2 signals are provided to the drain terminals of pass transistors 141 and 142, respectively. The source terminals of pass transistors 141 and 142 are commonly connected to node N1. The signal on node N1 is provided as the output clock signal CLK3.

Node N1 is further coupled to an input terminal of NAND gate 103. The other input terminal of NAND gate 103 is coupled to receive the inverse of the POR signal (i.e., PORb). The output terminal of NAND gate 103 is connected to the input terminal of inverter 134. The output terminal of inverter 134 is connected to node N1. When the PORb signal has a logic high value, NAND gate 103 is configured as an inverter. Under these conditions, NAND gate 103 and inverter 134 form a keeper circuit that is capable of holding the state of the signal on node N1. Note that inverter 134 and NAND gate 103 are designed to be weak relative to pass transistors 141 and 142. As a result, when clock signals CLK1 and CLK2 are driven onto node N1, these clock signals can easily change the state of node N1. For a more detailed description of clock control circuit 100, see U.S. Pat. No. 6,472,909 to Steven P. Young, issued Oct. 29, 2002, which is incorporated herein by reference.

Clock control circuit 100 works well in many applications, but has two potential shortcomings. First, switching between clocks requires each of flip-flops 111 and 112 to change state, which in turn requires each flip-flop 111 and 112 to be clocked by respective clock signals CLK1 and CLK2. Clock control circuit 100 is therefore incapable of switching between clock sources unless both clock sources are producing edges. If, for example, clock signal CLK1 were to stop, control circuit 100 would be unable to switch to clock signal CLK2. Second, control circuit could produce a "runt" pulse if a select-signal transition arrives at one of the flip-flops coincident with the respective clock signal, so select signal SEL should be timed to meet the set-up and hold-time requirements of the flip-flops. There is therefore a need for a glitchless clock control circuit that is capable of switching away from a failed clock, and for which there is no set-up or hold time requirement for the select signal.

SUMMARY

The present invention addresses the need for a glitchless clock control circuit capable of switching away from a failed clock. A clock control circuit in accordance with one embodiment routes one of a plurality of clock signals to a clock output node, and employs an asynchronous state machine to switch between clock signals without introducing glitches. To switch from a first to a second clock, the control circuit samples the logic level of the first clock signal to obtain a sampled logic level. The control circuit then provides the sampled logic level on the clock output terminal until the second clock signal transitions to the sampled logic level, at which point the control circuit routes the second clock signal to the clock output node.

The allowed claims, and not this summary, define the scope of the invention.

DETAILED DESCRIPTION

Figure 1:
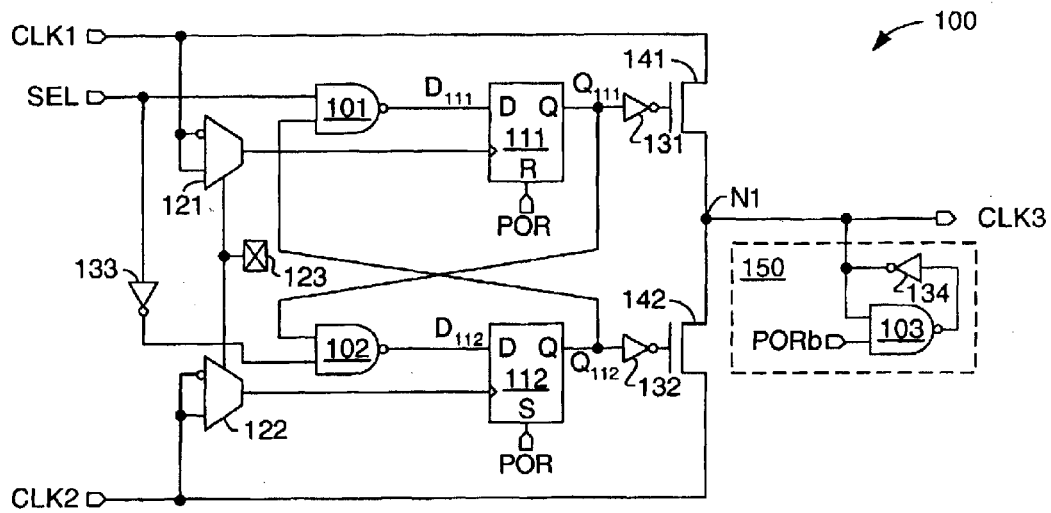
FIG. 1 (prior art) depicts a two-to-one clock control circuit 100 that provides either of two asynchronous clock signals CLK1 and CLK2 on a clock-distribution node CLK3.
Figure 2:
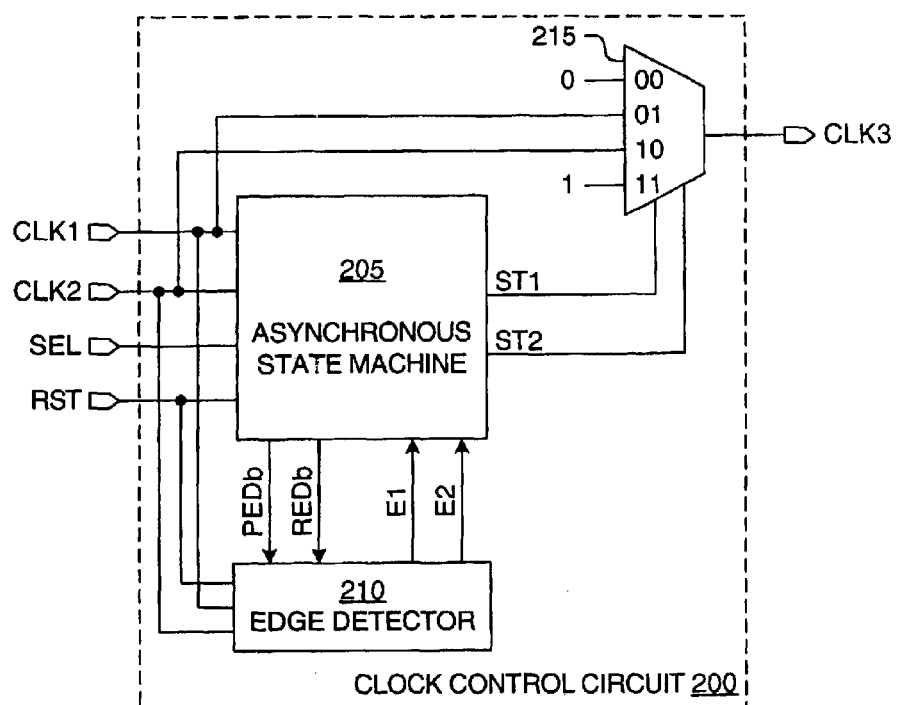
FIG. 2 depicts a clock control circuit 200 in accordance with one embodiment of the invention.

FIG. 2 depicts a clock control circuit 200 in accordance with one embodiment of the invention. Control circuit 200 provides either of a pair of clock signals CLK1 and CLK2 on an output node CLK3, the selected signal being determined by the logic level of a select signal SEL: in the depicted embodiment, SEL=0 selects clock CLK1 and SEL=1 selects clock CLK2. Control circuit 200 switches between clock signals CLK1 and CLK2 without introducing glitches in output signal CLK3, and is additionally capable of switching away from a failed clock. Also important, control circuit 200 does not require select signal SEL to meet any set-up or hold time requirement. These and other advantages are obtained with minimal increases in area and power consumption.

Control circuit 200 includes an asynchronous state machine 205, an edge detector 210, and a multiplexer 215. Edge detector 210 examines clock signals CLK1 and CLK2 and produces edge signals E1 and E2 in response to clock edges, and consequently provides measures of clock timing. State machine 205 examines edge signals E1 and E2 and the logic levels of clock signals CLK1 and CLK2 to determine the appropriate time to switch multiplexer 215 in response to select commands on select node SEL. A reset signal RST, issued e.g. at power up, resets control circuit 200. State machine 205 issues control signals PEDb and REDb to edge detector 210 for purposes detailed below.

Figure 3:
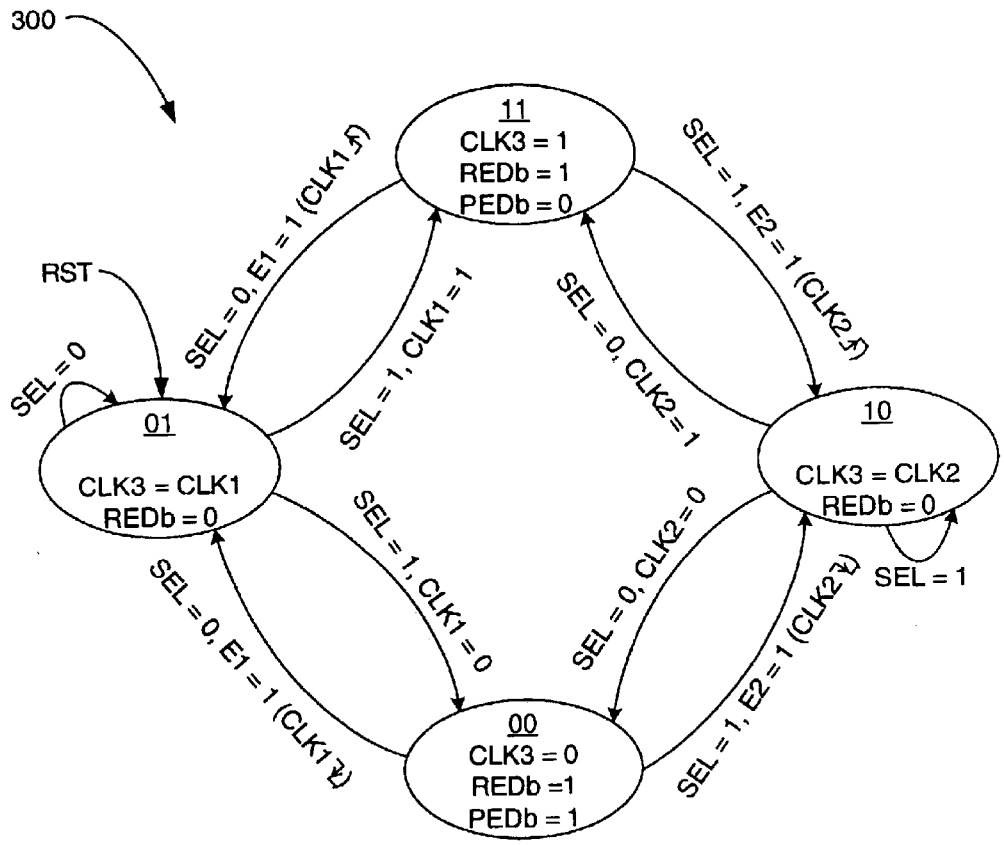
FIG. 3 is a state diagram 300 illustrating the operation of state machine 205 of FIG. 2.

FIG. 3 is a state diagram 300 illustrating the operation of state machine 205 of FIG. 2. Reset signal RST is conventionally issued at power up, so state machine 205 begins in state 01 (i.e., ST1=0; ST2=1). State machine 205 issues a reset-edge-detector signal REDb, where the "b" denotes the signal as active low, to edge detector 210, setting or resetting both edge signals E1 and E2 to logic zero. As shown in FIG. 2, state signals ST1 and ST2 control multiplexer 215, selecting clock signal CLK1 in this state. State machine 205 remains in state 01 as long as select signal SEL remains a logic zero.

Setting select signal SEL to logic one initiates a switch from clock signal CLK1 to clock signal CLK2. To avoid introducing a glitch that might otherwise be produced if switching at an instant in which clock signals CLK1 and CLK2 are at opposite logic levels, state machine 205 examines the current level of the selected clock signal CLK1 and switches to a state that holds the current level. If clock signal CLK1 is a logic one (i.e., CLK1=1), then state machine 205 switches to state 11 (i.e., St1=1; St2=1). As shown in FIG. 2, this combination of state signals causes multiplexer 215 to convey a constant logic one to output node CLK3 (the term "constant" is used here and elsewhere to indicate that, in contrast to the clock signals, the node providing the constant logic level is not permitted to transition in state 11). Also in state 11, state machine 205 de-asserts the reset-edge-detector signal REDb (REDb=1) and asserts an active-low positive-edge-detect signal PEDb (PEDb=0) to edge detector 210, preparing edge detector 210 to issue a logic one edge signal E2 in response to a subsequent rising edge of clock signal CLK2. State machine 205 then waits for edge signal E2 to go high, indicating clock signal CLK2 is a logic one, before transitioning to state 10. In state 10, multiplexer 215 switches to the logic-one clock signal CLK2 from the constant logic one, avoiding an undesirable falling edge and consequent glitch.

Returning to state 01, if the current level of clock signal CLK1 is a logic zero (i.e., CLK1=0) when select signal SEL is set to logic one, then state machine 205 switches to state 00. In state 00, state machine 205 causes multiplexer 215 to convey a constant logic zero to output node CLK3; de-asserts reset-edge-detector signal REDb (REDb=1); and de-asserts positive-edge-detect signal PEDb. Setting signal PEDb to a logic one prepares edge detector 210 to issue a logic one edge signal E2 in response to a subsequent falling edge of clock signal CLK2. State machine 205 then waits for edge signal E2 to go low, indicating clock signal CLK2 is a logic zero, before transitioning to state 10. In state 10, multiplexer 215 switches to the logic-zero clock signal CLk2 from the constant logic zero, avoiding an undesirable rising edge and consequent glitch.

State machine 205 remains in state 10, causing multiplexer 215 to provide clock signal CLK2 on output node CLK3, as long as select signal SEL remains at logic one. Bringing select signal SEL to logic zero initiates a switch back to state 01 by way of either state 00 or state 11.

The transition from state 10 to state 01 merely reverses the process described above for transitioning from state 01 to state 10. Upon receipt of a logic-zero select signal SEL in state 10, state machine 205 transitions to state 11 if the current level of clock signal CLK2 is a logic one and to state 00 if the current level of clock signal CLK2 is a logic zero. As before, multiplexer 215 conveys a constant logic one to output node CLK3 in state 11 and conveys a constant logic zero to output node CLK3 in state 00. In either case, the logic level conveyed on output node CLK3 does not change when transitioning from state 10, so the state transition does not introduce a signal edge on signal CLK3.

If in state 11, state machine 205 de-asserts the reset-edge-detector signal REDb and asserts the active-low positive-edge-detect signal PEDb to edge detector 210, preparing edge detector 210 to issue a logic one edge signal E1 in response to a subsequent rising edge of clock signal CLK1. State machine 205 then waits for edge signal E1 to go high, indicating clock signal CLK1 is a logic one, before transitioning to state 01. In state 01, multiplexer 215 switches to the logic-one clock signal CLK1 from the constant logic one, avoiding an undesirable falling edge and consequent glitch. If in state 00, state machine 205 de-asserts the reset-edge-detector signal REDb and the active-low positive-edge-detect signal PEDb, preparing edge detector 210 to issue a logic one edge signal E1 in response to a subsequent falling edge of clock signal CLK1. State machine 205 then waits for edge signal E1 to go high, indicating clock signal CLK1 is a logic zero, before transitioning to state 01. In state 01, multiplexer 215 switches to the logic-zero clock signal CLK1 from the constant logic zero, avoiding an undesirable rising edge and consequent glitch.

Transitioning between states 01 and 10, in either direction, switches output signal CLK3 from a selected one of clock signals CLK1 and CLK2 to the next without requiring a signal transition on the selected clock signal. Clock control circuit 200 thus facilitates switching away from a failed clock.

Select signal SEL is asynchronous with respect to either input clock signal, and could change levels in states 00 or 11. State machine 205 accounts for a change in the select signal in states 00 and 11 by returning to the state from which state machine 205 most recently transitioned, and does so without introducing undesirable glitches.

Figure 4:
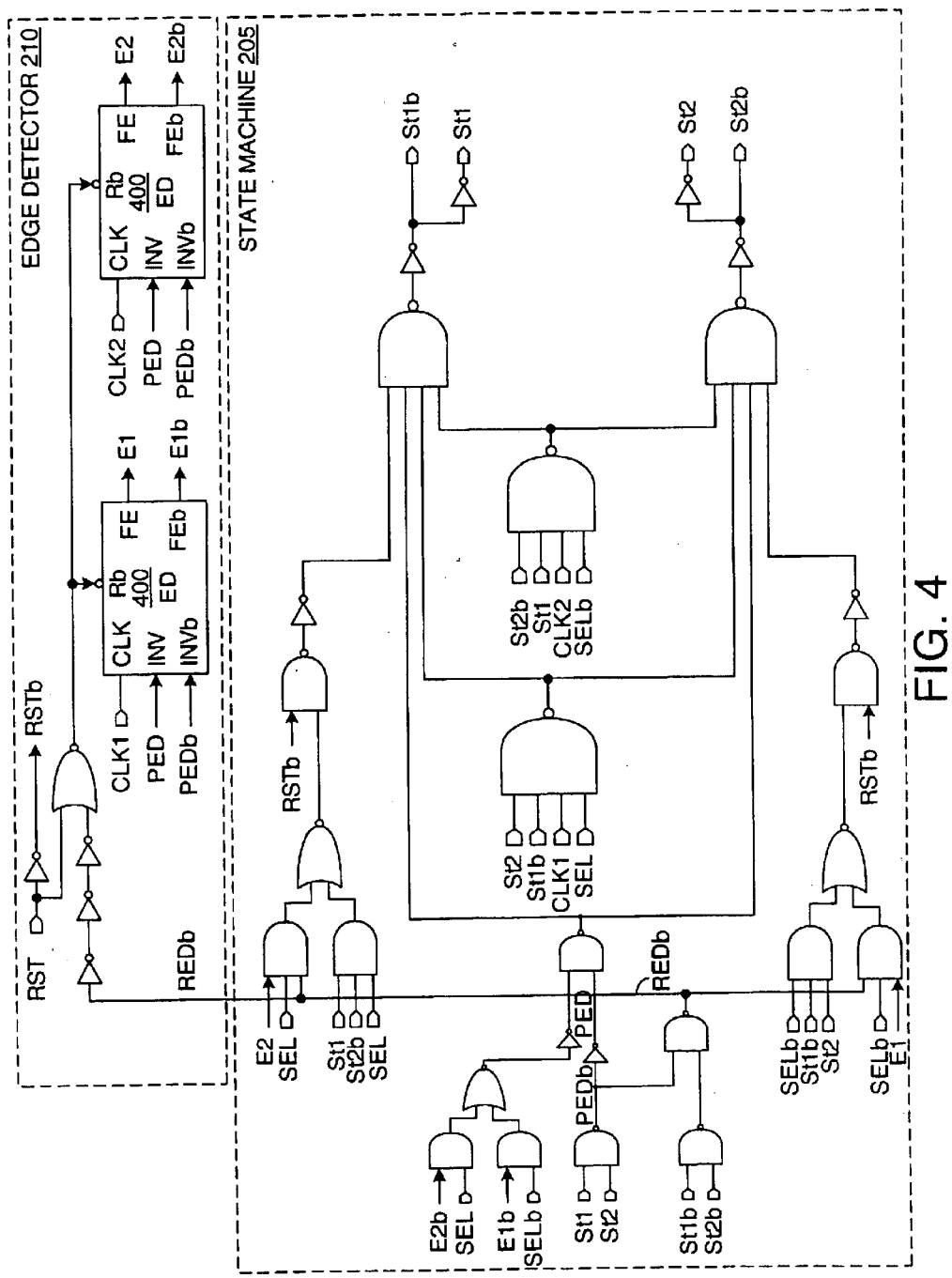
FIG. 4 details edge detector 210 and state machine 205 in accordance with one embodiment of the invention.
Figure 5:
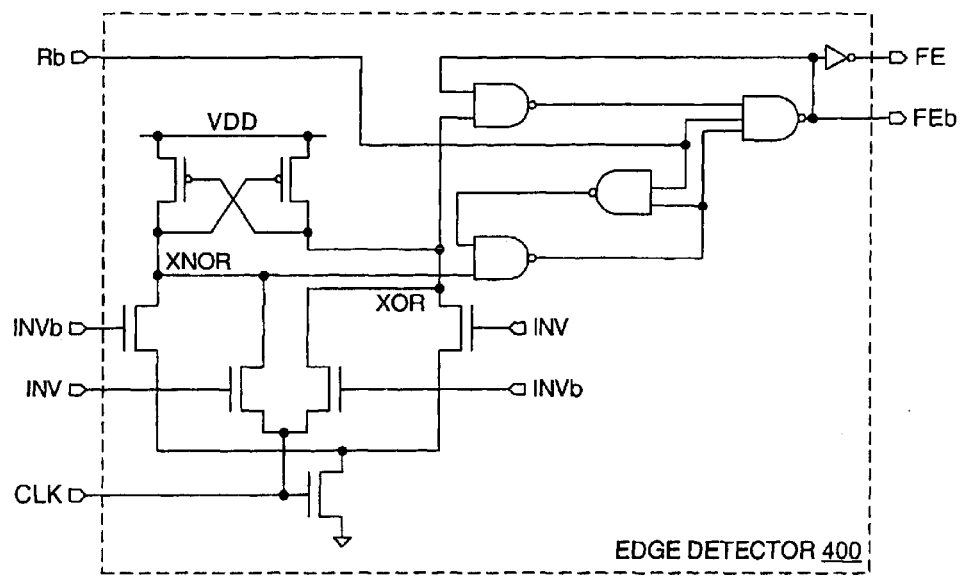
FIG. 5 details an embodiment of edge detector 400 of FIG. 4.

FIG. 4 details edge detector 210 and state machine 205 in accordance with one embodiment of the invention. Edge detector 210 includes a number of well-known logic symbols and a pair of edge detectors 400. Briefly, each edge detector 400, reset to logic zero (i.e., FE=0; FEb=1), responds to a selected type of edge (rising or falling) of a received clock signal by transitioning to a logic one. The logic levels on complementary input terminals INV and INVb determine the type of edge that instigates a transition: a one/zero combination causes edge detector 400 to issue a one/zero combination on complementary output terminals FE/Feb in response to a rising clock edge, while a zero/one combination causes edge detector 400 to issue the same output in response to a falling clock edge. FIG. 5, discussed below, details an embodiment of edge detector 400.

FIG. 4 details state machine 205 using conventional logic symbols: a detailed discussion of this embodiment is omitted here because the interpretation of conventional logic symbols is well within the skill of those in the art. The signals of FIG. 4 are the same as discussed above in connection with FIGS. 2 and 3, though many of those signals are supplemented with their complements. For example, FIG. 4 includes state signals St1 and St2 and their complements St1*b* and St2*b*. The use and derivation of complementary signals is also well within the skill of those in the art.

FIG. 5 details an embodiment of edge detector 400 of FIG. 4, again using conventional logic symbols. State machine 205 issues a logic zero positive-edge-detect signal PEDb (and a complementary logic one signal PED) to respective input terminals INVb and INV of edge detector 400 in state 11, causing edge detector 400 to detect positive-going clock edges. The depicted transistor configuration provides the exclusive-OR function of invert signal INV and clock signal CLK on a node XOR, and provides the exclusive-NOR function of the same two signals on a node XNOR.

State machine 205 issues a logic one positive-edge-detect signal PEDb (and a complementary logic zero signal PED) to respective input terminals INVb and INV of edge detector 400 in state 00, causing edge detector 400 to detect negative-going clock edges. State machine 205 thus configures edge detector 400, as needed, to detect one type of clock edge. In an alternative embodiment, four edge detectors 400 can be used, one for each combination of clock-signal/edge-type combination.

Figure 6:
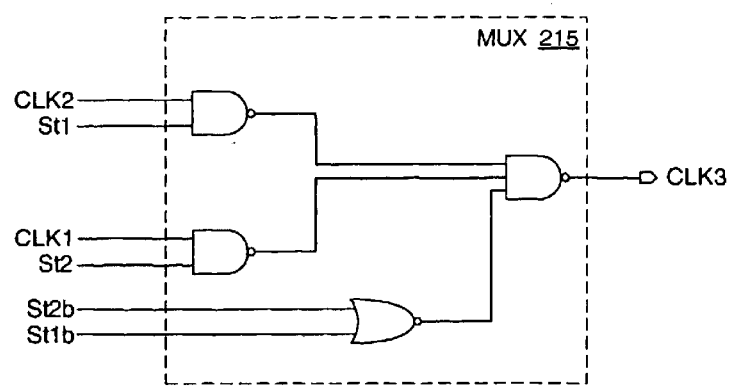
FIG. 6 depicts an embodiment of multiplexer 215 of FIG. 2.

FIG. 6 depicts an embodiment of multiplexer 215 of FIG. 2 that receives as select inputs complementary state signals St1/St1*b* and St2/St2*b*. This embodiment simply and effi ciently implements the requisite logic, using combinations of state signals St1 and St2 to deliver the constant logic levels used in states 00 and 11. Many other multiplexer circuits are available for use as multiplexer 215.

While the present invention has been described in connection with specific embodiments, variations of these embodiments will be obvious to those of ordinary skill in the art. For example, clock control circuits in accordance with the invention can be extended to accommodate additional clock sources, and the distributed clock signals can be differential signals. Moreover, unless otherwise defined, terminals, lines, conductors, and traces that carry a given signal fall under the umbrella term "node"; in general, the choice of a given description of a circuit node is a matter of style, and is not limiting. Therefore, the spirit and scope of the appended claims should not be limited to the foregoing description.

What is claimed is:

1. A clock control circuit comprising:
   a. a first clock input terminal receiving a first clock signal;
   b. a second clock input terminal receiving a second clock input signal;
   c. a clock output terminal conveying a selected one of the first and second clock signals;
   d. a clock select terminal receiving a clock select signal;
   e. an asynchronous state machine receiving the first and second clock signals and the clock select signal, the state machine determining which of the first and second clock signals is conveyed by the clock output terminal in response to the clock select signal.

2. The clock control circuit of claim 1, further comprising a multiplexer having a first multiplexer input terminal connected to the first clock input terminal, a second multiplexer input terminal connected to the second clock input terminal, and at least one multiplexer select terminal.

3. The clock control circuit of claim 2, wherein the state machine operates in a plurality of states, and wherein each of the plurality of states produces unique state data on a plurality of state-output terminals.

4. The clock control circuit of claim 3, wherein the state output terminals connect to the at least one multiplexer select terminal.

5. The clock control circuit of claim 1, wherein the state machine operates in a plurality of states, including a first state conveying the first clock signal on the clock output terminal, a second state conveying the second clock signal on the clock output terminal, and a third state conveying a constant logic level on the clock output terminal.

6. The clock control circuit of claim 5, wherein the plurality of states includes a fourth state conveying a second constant logic level on the clock output terminal.

7. The clock control circuit of claim 1, further comprising a clock edge detector connected to at least one of the first and second clock input terminals, the clock edge detector producing edge signals in response to clock edges.

8. The clock control circuit of claim 7, wherein the state machine operates in a plurality of states, and wherein the edge detector detects positive edges in a first of the states and detects negative edges in a second of the states.

9. The clock control circuit of claim 7, wherein the edge detector separately detects edges of the first clock signal and the second clock signal.

10. A method of switching between first and second clock signals, each clock signal exhibiting a first logic level and a second logic level, the method comprising:
   a. providing the first clock signal on a clock output terminal;

b. receiving a select command indicating a switch from the first clock signal to the second clock signal;

c. examining the first clock signal to obtain a current logic level;

d. providing the current logic level on the clock output terminal;

e. awaiting a clock edge on the second clock signal indicating the second clock signal is of the sampled logic level; and f. providing the second clock signal on the clock output terminal in response to the clock edge.

11. The method of claim 10, wherein the current logic level represents a logic one, and wherein the clock edge on the second clock signal is a rising edge.

12. The method of claim 10, further comprising:

g. receiving a second select command indicating a switch from the second clock signal to the first clock signal;

h. examining the second clock signal to obtain a second current-logic level;

i. providing the second current logic level on the clock output terminal;

j. awaiting a second clock edge on the first clock signal indicating the first clock signal is of the second current logic level; and k. providing the first clock signal on the clock output terminal in response to the second clock edge.

13. The method of claim 10, wherein the first clock signal remains at the current logic level while awaiting the clock edge on the second clock signal and while providing the second clock signal on the clock output terminal.

14. A clock control circuit comprising:

a. a multiplexer including:
   i. a first clock input terminal receiving a first clock signal, the first clock signal alternating between first and second logic levels;
   ii. a second clock input terminal receiving a second clock input signal, the second clock signal alternating between the first and second logic levels; and
   iii. a clock output terminal;
   iv. at least one clock select terminal;

b. a state machine connected to the clock select terminal, the state machine having:
   i. a first state controlling the multiplexer to connect the first clock input terminal to the clock output terminal; and
   ii. a second state controlling the multiplexer to connect the second clock input terminal to the clock output terminal.

15. The clock control circuit of claim 14, further comprising a select terminal receiving a select signal, wherein the state machine switches between the first and second states in response to changes in the select signal.

16. The clock control circuit of claim 14, wherein the state machine, in response to the changes in the select signal, switches to a third state controlling the multiplexer to connect a constant logic level to the clock output terminal.

17. The clock control circuit of claim 16, wherein the state machine switches from the third state to the second state in response to an edge of the second clock.

18. The clock control circuit of claim 16, wherein the state machine switches from the third state to the first state in response to an edge of the first clock.

19. The clock control circuit of claim 16, wherein the state machine switches to the third state if the first clock is of the first logic level, and switches to a fourth state if the first clock is of the second logic level.

* * * * *